United States Patent
Sanders

(10) Patent No.: US 9,094,450 B2
(45) Date of Patent: Jul. 28, 2015

(54) METHOD AND APPARATUS FOR A CENTRALLY MANAGED NETWORK VIRUS DETECTION AND OUTBREAK PROTECTION

(71) Applicant: Xerox Corporation, Norwalk, CT (US)

(72) Inventor: Aaron Dale Sanders, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 29 days.

(21) Appl. No.: 14/070,163

(22) Filed: Nov. 1, 2013

(65) Prior Publication Data

US 2015/0128276 A1 May 7, 2015

(51) Int. Cl.
G06F 12/14 (2006.01)
H04L 29/06 (2006.01)

(52) U.S. Cl.
CPC .................................. *H04L 63/145* (2013.01)

(58) Field of Classification Search
None
See application file for complete search history.

(56) References Cited

U.S. PATENT DOCUMENTS

| 6,742,128 | B1 | 5/2004 | Joiner |
| 7,062,553 | B2 | 6/2006 | Liang |
| 7,216,366 | B1 | 5/2007 | Raz et al. |
| 7,386,888 | B2 | 6/2008 | Liang et al. |
| 7,418,732 | B2 | 8/2008 | Campbell et al. |
| 7,765,410 | B2 | 7/2010 | Costea et al. |
| 7,860,006 | B1 | 12/2010 | Kashyap et al. |
| 7,895,657 | B2 | 2/2011 | Bennett |
| 7,949,329 | B2 | 5/2011 | Benco et al. |
| 8,490,186 | B1* | 7/2013 | Dalcher et al. ................... 726/22 |
| 2004/0158730 | A1 | 8/2004 | Sarkar |
| 2006/0282893 | A1 | 12/2006 | Wu et al. |
| 2010/0312984 | A1* | 12/2010 | Robin et al. .................. 711/171 |
| 2013/0051326 | A1* | 2/2013 | Jeyatharan et al. ........... 370/328 |

* cited by examiner

*Primary Examiner* — Kaveh Abrishamkar

(57) ABSTRACT

A method, non-transitory computer readable medium, and apparatus for configuring a virus detection of a plurality of network elements in a communication network are disclosed. For example, the method monitors an attribute of each one of the plurality of network elements, detects the attribute of one or more of the plurality of network elements breaches at least one respective threshold, configures each one of the one or more of the plurality of network elements to reduce a number of virus detection processes of the virus detection in accordance with a respective type of network element and resumes a normal virus detection for each one of the one or more of the plurality of network elements when the attribute of a respective one of the one or more network elements does not breach the respective threshold.

18 Claims, 3 Drawing Sheets

METHOD AND APPARATUS FOR A CENTRALLY MANAGED NETWORK VIRUS DETECTION AND OUTBREAK PROTECTION

The present disclosure relates generally to virus protection for various network elements within a communication network and, more particularly, to a method and apparatus for a centrally managed network virus detection and outbreak protection.

BACKGROUND

Current anti-malware approaches primarily focus on the perimeter and endpoint devices. This makes it difficult to isolate infected systems or slow the virus propagation.

Additionally, the current approach of scanning for a large number of known (but not necessarily dangerous) viruses makes it difficult to scan for viruses on devices with limited compute resources, or those that require fast data processing. Additionally, scanning at the operation system/application layer makes it easier for malware to avoid detection or disable anti-virus programs, as malware programs are given an opportunity to partially execute prior to their detection.

SUMMARY

According to aspects illustrated herein, there are provided a method, a non-transitory computer readable medium, and an apparatus for configuring a virus detection of a plurality of network elements in a communication network. One disclosed feature of the embodiments is a method that monitors an attribute of each one of the plurality of network elements, detects the attribute of one or more of the plurality of network elements breaches at least one respective threshold, configures each one of the one or more of the plurality of network elements to reduce a number of virus detection processes of the virus detection in accordance with a respective type of network element and resumes a normal virus detection, for each one of the one or more of the plurality of network elements when the attribute of a respective one of the one or more network elements no longer breaches the respective threshold.

Another disclosed feature of the embodiments is a non-transitory computer-readable medium having stored thereon a plurality of instructions, the plurality of instructions including instructions which, when executed by a processor, cause the processor to perform an operation that monitors an attribute of each one of the plurality of network elements, detects the attribute of one or more of the plurality of network elements breaches at least one respective threshold, configures each one of the one or more of the plurality of network elements to reduce a number of virus detection processes of the virus detection in accordance with a respective type of network element and resumes a normal virus detection for each one of the one or more of the plurality of network elements when the attribute of a respective one of the one or more network elements no longer breaches the respective threshold.

Another disclosed feature of the embodiments is an apparatus comprising a processor and a computer readable medium storing a plurality of instructions which, when executed by the processor, cause the processor to perform an operation that monitors an attribute of each one of the plurality of network elements, detects the attribute of one or more of the plurality of network elements breaches at least one respective threshold, configures each one of the one or more of the plurality of network elements to reduce a number of virus detection processes of the virus detection in accordance with a respective type of network element and resumes a normal virus detection for each one of the one or more of the plurality of network elements when the attribute of a respective one of the one or more network elements no longer breaches the respective threshold.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for configuring a virus detection of a plurality of network elements in a communication network. As discussed above, current anti-malware approaches primarily focus on the perimeter and endpoint devices. This makes it difficult to isolate infected systems or slow the virus propagation.

Additionally, the current approach of scanning for a large number of known (but not necessarily dangerous) viruses makes it difficult to scan for viruses on devices with limited compute resources, or those that require fast data processing. Additionally, scanning at the operation system/application layer makes it easier for malware to avoid detection or disable anti-virus programs, as malware programs are given an opportunity to partially execute prior to their detection.

One embodiment of the present disclosure provides a centrally managed network virus detection and outbreak prevention. For example, a central server may manage, control and configure each one of a plurality of network elements within a communication network in accordance with one or more attributes based upon a type of network element. For example, an access point may have a high traffic load and the central server may reduce processing resources for the virus detection processes (e.g., specifying two high risk viruses to scan for rather than an entire library of 100) to ensure that the access point can handle the high traffic load.

In another example, a network switch may have a high traffic load, but only two ports within the switch that have data coming from an untrusted network. As a result, the central server may configure the virus detection processes to only run on the two ports while allowing data in the remaining ports to flow freely. Other examples may be evident based on the disclosure described herein.

Figure 1:
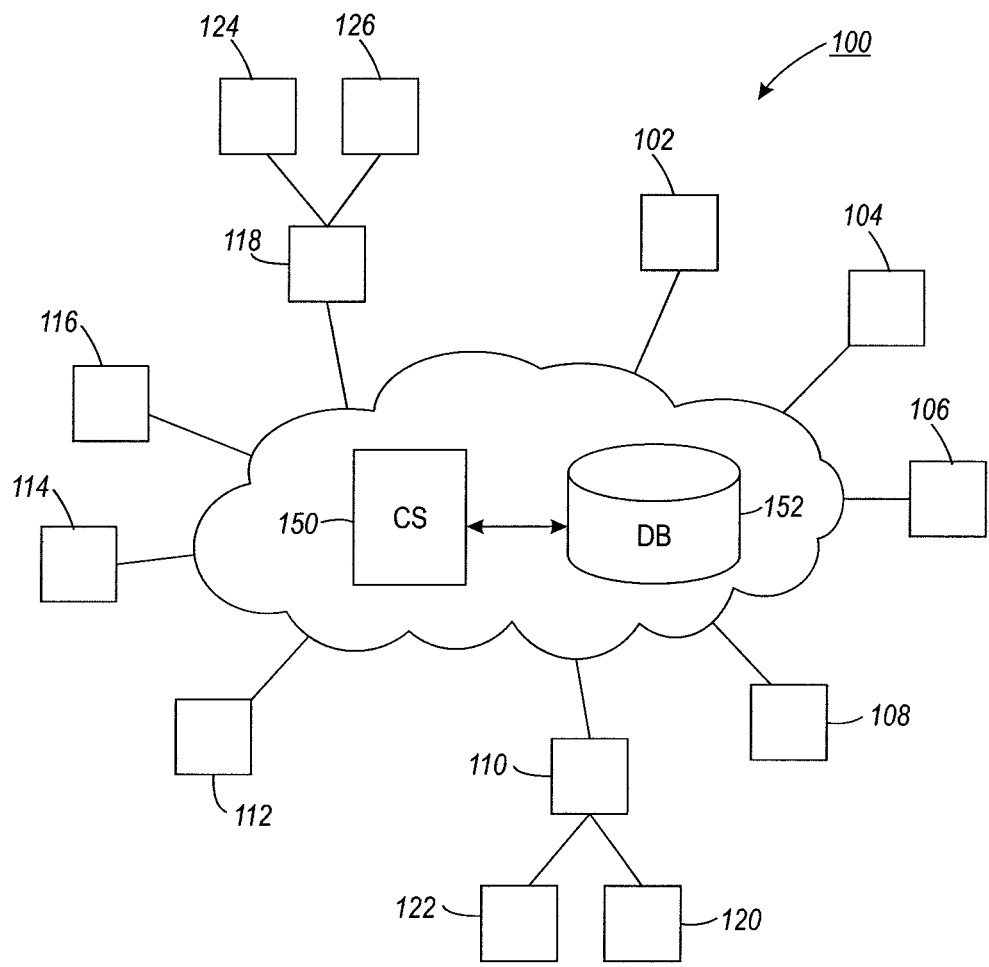
FIG. 1 illustrates example communication network.

FIG. 1 illustrates a communication network 100. In one embodiment, the communication network 100 may be any type of network such as a Wi-Fi network, an access network, a wide area network (e.g., an enterprise having multiple different locations across the country), a local area network within a single enterprise location, a cellular network, and the like.

In one embodiment, the communication network 100 may include a central server (CS) 150 and a database (DB) 152. In one embodiment, the CS 150 may be in communication with one or more network elements 102-118 within the communication network 100. Although nine network elements 102-118 are illustrated in FIG. 1, any number of network elements may be deployed in the communications network 100.

In one embodiment, some of the network elements (e.g., the network elements 110 and 118) may also include additional network elements 120, 122, 124 and 126 behind them. For example, the network element 110 may be an access point having mobile endpoint devices 120 and 122 connected to the access point or the network element 118 may be a firewall having one or more personal computers connected to the firewall.

In one embodiment, the network elements 102-118 may include various different network elements. For example, the network elements may be a personal computer, a laptop, a tape drive, a storage area network, an access point (e.g., wired or wireless), a network switch, a mobile endpoint device, a tablet computer, a multifunction device/printer, a server, a firewall, a network audio/video appliance, a gateway, a router, a spam appliance, a internet connected smart device, and the like.

In one embodiment, each one of the network elements 102-118 may execute a scanning agent for a virus definition library. For traditional devices, such as PCs and tablet computers, the agent and the library may be stored on a hard drive, random access memory, read only memory, and the like. For non-traditional devices, such as switches, access points, printers and the like, the agent and the library may be stored in a network interface card or a host bus adapter.

In one embodiment, each one of the various different types of network elements 102-118 has different attributes. In addition, each one of the various different types of network elements 102-118 may have one or more attributes that are relatively important to the performance and reliability of the network element. For example, the attribute of a network switch may be a throughput percentage or a trusted network (e.g., specific approved internet protocol (IP) addresses or media access control (MAC) addresses), the attribute of a server or computer may be central processing unit (CPU) utilization percentage or a memory usage (e.g., how much memory is left), the attribute of a storage area network may be power consumption (e.g., how much electricity is being used during a peak hour or an off-peak hour) or an available amount of memory, the attribute for a firewall may be environmental awareness (e.g., what other devices are connected to it, are the devices that are connected to it trusted or untrusted, and the like) or number of viruses detected (e.g., overall or on a per port or connection basis), the attribute of an access point may be available bandwidth or environmental awareness, the attribute of a tablet computer may be the last network it connected to, and the like.

In one embodiment, each one of the monitored attributes for each one of the different network elements 102-118 may be associated with a respective threshold. For example, when a throughput percentage of a switch rises above 75% of a maximum throughput the CS 102 may determine that an adjustment of the configuration of the switch may need to be made to allow the switch to provide sufficient throughput while running less virus detection.

In one embodiment, the DB 152 may store information about each network element 102-118, which attribute or attributes are monitored for each one of the network elements 102-118 and the respective thresholds for each attribute of each one of the network elements 102-118. In one embodiment, the DB 152 may also store an associated back-off timer used to ensure the network elements 102-118 are functioning normally before resuming normal virus detection processes.

In one embodiment, the CS 150 may be in communication with the DB 152 and the network elements 102-118. In one embodiment, the CS 150 may monitor the appropriate attribute or attributes for each one of the network elements 102-118. Based on the respective thresholds, the CS 150 may then determine whether any one or more of the network elements 102-118 need to be re-configured to reduce virus detection processes. In one embodiment, the respective thresholds may include a single major threshold or a plurality of minor thresholds.

For example, for a network switch, a major threshold may be throughput falling below 75% of a maximum throughput. However, the network switch may also have a plurality of minor thresholds, e.g., a power usage above 50% of a rolling average, 2 or more ports receiving no traffic and more than 50% of the traffic coming from the same IP address. For example, none of the minor thresholds may indicate a problem by themselves, but a combination of all three minor thresholds being breached may indicate an overload or problem that would require the CS 150 to take action.

For example, during normal virus detection processes the network elements 102-118 may be required to monitor for 100 potential viruses on all portions of the network element 102-118. For example, a switch may be required to scan all ports for all 100 viruses, a computer may be required to scan all memory locations and data for all 100 viruses, an access point may be required to scan all transmission for all 100 viruses, and the like.

In one embodiment, reducing virus detection processes may be defined as scanning for less than the normal virus detection processes on a specific portion of the network element 102-118. For example, if the access point is over utilizing its CPU to process transmission above its respective threshold, the CS 150 may configure the access point to only scan and/or search for the latest two viruses out of the entire library of 100 viruses and only scan for the two viruses from data coming from a specific internet protocol (IP) address. Thus, some CPU capacity may be freed to process data transmissions to reduce the CPU utilization below its respective threshold.

In one embodiment, the CS 150 may have access to configure various settings on each one of the plurality of network elements 102-118. For example, one configuration may be prioritizing or pushing specific virus definitions or a specific number of virus definitions on specific ones of the plurality of network elements 102-118. For example, if a potential virus only affects an operating system of a personal computer, the CS 150 may not need to push the virus definition or prioritize the virus definition on the network switches, firewalls, access points, multi-function devices/printers, and the like.

Another configuration may be file types and directories that are scanned. For example, the CS 150 may configure the network elements 102-118 to only scan files that are considered to be high risk.

Another configuration may be scanning on a specific port, adapter or host. For example, the CS 150 may only scan a specific port instead of all traffic passing through the device to maintain throughput.

Another configuration may be blocking traffic from certain ports, adapter, hosts, IP addresses or MAC addresses. For example, to prevent an outbreak if the CS 150 knows a particular network element (e.g., the network element 102) is infected, the CS 150 may configure the remaining network elements (e.g., the network elements 104-118) to block traffic from the network element 102 with a specific MAC address within the communication network 100.

Another configuration may be offloading the virus detection processes to a secondary processor. For example, on a PC, the graphical processing unit (GPU) may perform some of the same functions of the central processing unit (CPU). Thus, if the CPU is over utilized, the CS 150 may configure the PC to offload some of the virus scanning processes from the CPU to the GPU.

In one embodiment, as discussed above, a back-off timer may be used in association with the monitored attributes and respective thresholds. The back-off timer may be based upon a last event or a last detection time. The duration of the back-off timer may be defined by a network administrator.

For example, the last event may be when a monitored attribute of a network element 102-118 breaches its respective threshold. A back-off timer may be triggered (e.g., 10 minutes) to count down. In one embodiment, if the attribute no longer breaches its respective threshold (e.g., above or below depending on the threshold) at the duration of the back-off timer, the CS 150 may resume normal virus detection processes (e.g., resume scanning all portions of the network element 102-118 for the entire library of virus definitions).

In another embodiment, once the monitored attribute is no longer breaching the respective threshold, the back-off timer may begin counting down. If the monitored attribute does not re-breach the respective threshold for the duration of the back-off timer, the CS 150 may ensure that the situation has been address and allow the network element 102-118 to resume normal virus detection processes.

In one embodiment, the back-off timer based upon a last detection may be an amount of time since the last malware or virus detection. The back-off timer based upon the last detection may operate similarly to the way the back-off timer based upon a last event operates.

In one embodiment, the CS 150 may use the attribute, the respective threshold and configuration control to perform a "if x, then y" operation. Specific examples, to illustrate the application of the features described above are provided in the following scenarios.

A first scenario may include a layer 2 switch having a monitored attribute of throughput and a respective threshold of 75% of the maximum throughput. In one embodiment, the CS 150 may detect that the throughput of the layer 2 switch has fallen below 75%. The CS 150 may then configure the layer 2 switch to reduce the number of virus definitions that are scanned for, reduce scanning to only MAC addresses and ports that have transmitted a virus in the past 24 hours. Once the throughput is back above 75%, the CS 150 may begin a back-off timer for one hour to ensure that the throughput remains above 75% for the duration of the back-off timer. If successful, the CS 150 may then resume normal virus detection processes on the layer 2 switch.

A second scenario may include a computer having a monitored attribute of CPU utilization and a respective threshold of 40% of available CPU processing capability. In one embodiment, the CS 150 may detect that the CPU utilization has risen above 40%. The CS 150 may then configure the computer to reduce the number of virus definitions that are scanned for and reduce the file types and directory locations that are scanned. Once the CPU utilization is below 40%, the CS 150 may begin a back-off timer for 10 minutes to ensure that the CPU utilization remains below 40%. If successful, the CS 150 may then resume normal virus detection processes on the computer.

In a third scenario, the CS 150 may be used to prevent and control virus outbreaks throughout the network 100. For example, the CS 150 detects a conficker worm on a host with MAC address 04-7D-7B-4C-C8-4A with an IP address of 10.10.10.10. The CS 150 may then alert all network elements 102-118 to load the conficker definition and scan any traffic from a host with the MAC address 04-7D-7B-4C-C8-4A and an IP address of 10.10.10.10. The CS 150 may begin a back-off timer for 2 hours. If the conficker worm is not detected within the 2 hours, the CS 150 may resume normal virus detection processes on the network elements 102-118.

In one embodiment, all three scenarios may happen simultaneously. By centrally managing and controlling virus detection and outbreak prevention with the CS 150, the CS 150 may coordinate configuration of each one of the network elements 102-118 to maintain performance of the communications network while maintaining virus detection and push specific definitions to manage outbreak prevention at the same time.

In contrast, previous communications networks had each network element operate independently and information would cascade from one network element to another network element slowly. As a result, viruses may pass through some of the network elements that did not receive a virus update or the virus may spread faster than the information could cascade from one network element to another network element.

The embodiments of the present disclosure also allow for easy scaling of any network elements within the communication network 100. For example, network elements with high compute models or low compute models may be easily added and managed for virus detection and virus outbreak prevention. In addition, the network elements may be proactively managed to maintain virus protection, while not jeopardizing performance of the network elements which may affect customer satisfaction. In addition, the embodiments of the present disclosure allow a single virus definition to be pushed to specific network elements on-demand rather than requiring all virus definitions to be pushed to all network elements periodically, whether the network elements are at risk or not.

Figure 2:
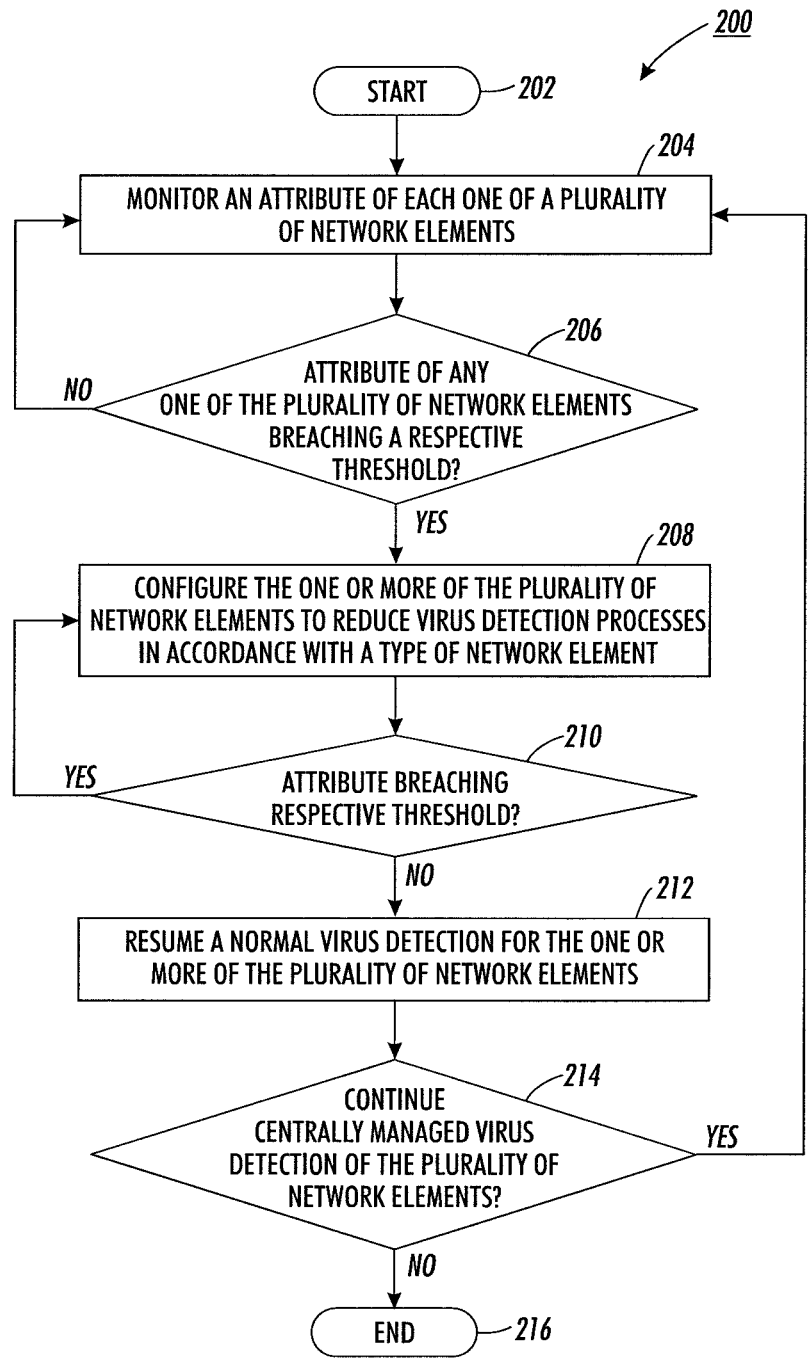
FIG. 2 illustrates an example flow chart of a method for configuring a virus detection of a plurality of network elements in a communication network.

FIG. 2 illustrates a flowchart of a method 200 for configuring a virus detection of a plurality of network elements in a communication network. In one embodiment, one or more steps or operations of the method 200 may be performed by the CS 150 or a general purpose computer 300 illustrated in FIG. 3.

The method 200 begins at step 202. At step 204 the method 200 monitors an attribute of each one of a plurality of network elements. In one embodiment, the plurality of network elements may include a personal computer (PC), a laptop, a tape drive, a storage area network, an access point, a network switch, a mobile device, a tablet computer, a multifunction device, a server, a firewall or an internet connected smart device.

In one embodiment, the attributes may be based on a type of network element. In other words, different network elements have different attributes that are monitored. In one embodiment, the attribute that is monitored may be an attribute that affects a performance of the network element to perform its intended function (e.g., CPU utilization for a computer, memory availability for a storage network, bandwidth availability for an access point, throughput for a network switch, and the like). In one embodiment, attributes may include being part of a trusted network, a last network connected to, a throughput, an available bandwidth, environmental sustainability, a number of virus detections, available processing resources, a memory usage, an environment awareness or transmissions to and from a trusted source.

At step 206, the method 200 determines if an attribute of any one of the plurality of network elements breaches a respective threshold. For example, each one of the plurality of network elements may have a respective threshold for the monitored attribute. Depending on the type of attribute and respective threshold, breaching may include either going above or falling below the respective threshold. In one embodiment, the threshold may include a single major threshold or may include a plurality of minor thresholds.

If none of the plurality of network elements has an attribute that breaches its respective threshold, the method 200 may return to step 204 to continue monitoring the plurality of network elements. However, if one or more of the plurality of network elements has its attribute breach its respective threshold, the method 200 may proceed to step 208.

At step 208, the method 200 configures the one or more of the plurality of network elements to reduce virus detection processes in accordance with a type of network element. In one embodiment, configuring may include maintaining the virus detection processes for a reduced number of potential viruses compared to the normal virus detection including one or more targeted viruses. In one embodiment, configuring may also include reducing the virus detection to a specific portion of each one of the one or more of the plurality of network elements (e.g., a specific port out of all available ports, traffic from a specific address, a specific file directory out of all available file directories, and the like).

For example, if a potential virus only affects an operating system of a personal computer, the CS may not need to push the virus definition or prioritize the virus definition on the network switches, firewalls, access points, multi-function devices/printers, and the like. In another example, the CS may configure the network elements to only scan files that are considered to be high risk. In another example, the CS may instruct a network element to only scan a specific port instead of all traffic passing through the device to maintain throughput. In another example, to prevent an outbreak if the CS knows a particular network element is infected, the CS may configure the remaining network elements to block traffic from the network element with a specific MAC address within the communication network. In another example, the CS may configure the network element to offload the virus detection processes from a CPU to a GPU.

At step 210, the method 200 determines if the attribute of the one or more of the network elements does not breach the respective threshold. In one embodiment, the method 200 may determine if the attribute is below the respective threshold for a duration of a back-off timer. For example, a back-off timer may be used in association with the monitored attributes and respective thresholds. The back-off timer may be based upon a last event or a last detection time. The duration of the back-off timer may be defined by a network administrator.

If the answer to step 210 is no, the method 200 may return to step 208 and continue to configure the one or more of the plurality of network elements to reduce virus detection processes. If the answer to step 210 is yes, the method 200 may proceed to step 212.

At step 212, the method 200 resumes a normal virus detection (e.g., a previous virus detection mode of operation for a particular type of network element or a default mode of operation for a particular type of network element) for the one or more of the plurality of network elements that have its attribute that does not breach its respective threshold. For example, the normal virus detection may be defined as scanning for all available virus definitions that were scanned for on the entire network element as opposed to the reduced virus detection that scans for less than all of the available virus definitions on only a portion of the network element (i.e., not the entire network element).

At step 214, the method 200 determines if the centrally managed virus detection of the plurality of network elements should continue. For example, the central server may be taken down temporarily for maintenance or it may be desirable to temporarily manage the virus detection of each network element separately. If the centrally managed virus detection should continue, the method 200 may return to step 204 to continue monitoring the attribute of each one of the plurality of network elements.

However, if the centrally managed virus detection should stop, the method 200 may proceed to step 216. The method 200 ends at step 216.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

Figure 3:
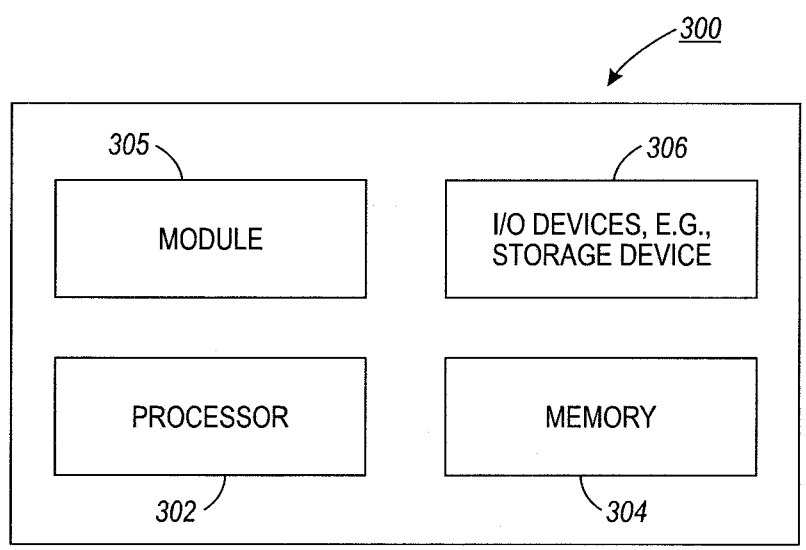
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for configuring a virus detection of a plurality of network elements in a communication network, and various input/output devices 306 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 305 for configuring a virus detection of a plurality of network elements in a communication network can be loaded into memory 304 and executed by processor 302 to implement the functions as discussed above. As such, the present method 305 for configuring a virus detection of a plurality of network elements in a communication network (including associated data structures) of the present disclosure can be stored on a non-transitory (e.g., physical and tangible) computer readable storage medium, e.g., RAM memory, magnetic or optical drive or diskette and the like. For example, the hardware processor 302 can be programmed or configured with instructions (e.g., computer readable instructions) to perform the steps, functions, or operations of method 200.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for configuring a virus detection of a plurality of different network elements in a communication network, comprising:
    monitoring, by a processor, a respective attribute of each one of the plurality of different network elements, wherein the respective attribute is different for each one of the plurality of different network elements, wherein the respective attribute is based on a performance and a type of a network element of the plurality of different network elements associated with the respective attribute;
    detecting, by the processor, the respective attribute of one or more of the plurality of different network elements breaches at least one respective threshold;
    configuring, by the processor, each one of the one or more of the plurality of different network elements to reduce a number of virus detection processes of the virus detection in accordance with a respective type of network element; and
    resuming, by the processor, a normal virus detection for each one of the one or more of the plurality of different network elements when the respective attribute of a respective one of the one or more of the plurality of different network elements does not breach the respective threshold.

2. The method of claim 1, wherein the processor is deployed as part of a central server in communication with the each one of the plurality of different network elements.

3. The method of claim 1, wherein the respective attribute comprises at least one of: being part of a trusted network, a last network connected to, a throughput, an available bandwidth, an environmental sustainability, a number of virus detections, available processing resources, a memory usage, an environment awareness or transmissions to and from a trusted source.

4. The method of claim 1, wherein the at least one respective threshold comprises a single threshold.

5. The method of claim 1, wherein the at least one respective threshold comprises a plurality of thresholds.

6. The method of claim 1, wherein the plurality of different network elements comprises a personal computer (PC), a laptop, a tape drive, a storage area network, an access point, a network switch, a mobile device, a tablet computer, a multifunction device, a server, a firewall or an internet connected smart device.

7. The method of claim 1, wherein the configuring comprises:
    maintaining, by the processor, the virus detection for a reduced number of potential viruses compared to the normal virus detection including one or more targeted viruses.

8. The method of claim 1, wherein the configuring comprises:
    reducing, by the processor, the number of virus detection processes to a specific portion of the each one of the one or more of the plurality of different network elements.

9. The method of claim 1, wherein the resuming comprises requiring the respective attribute to be below the at least one respective threshold for a duration of a back-off timer before resuming the normal virus detection.

10. A non-transitory computer-readable medium storing a plurality of instructions which, when executed by a processor, cause the processor to perform operations for configuring a virus detection of a plurality of different network elements in a communication network, the operations comprising:
    monitoring a respective attribute of each one of the plurality of different network elements, wherein the respective attribute is different for each one of the plurality of different network elements, wherein the respective attribute is based on a performance and a type of a network element of the plurality of different network elements associated with the respective attribute;
    detecting the respective attribute of one or more of the plurality of different network elements breaches at least one respective threshold;
    configuring each one of the one or more of the plurality of different network elements to reduce a number of virus detection processes of the virus detection in accordance with a respective type of network element; and
    resuming a normal virus detection for each one of the one or more of the plurality of different network elements when the respective attribute of a respective one of the one or more of the plurality of different network elements does not breach the respective threshold.

11. The non-transitory computer-readable medium of claim 10, wherein the respective attribute comprises at least one of: being part of a trusted network, a last network connected to, a throughput, an available bandwidth, an environmental sustainability, a number of virus detections, available processing resources, a memory usage, an environment awareness or transmissions to and from a trusted source.

12. The non-transitory computer-readable medium of claim 10, wherein the at least one respective threshold comprises a single threshold.

13. The non-transitory computer-readable medium of claim 10, wherein the at least one respective threshold comprises a plurality of thresholds.

14. The non-transitory computer-readable medium of claim 10, wherein the plurality of different network elements comprises a personal computer (PC), a laptop, a tape drive, a storage area network, an access point, a network switch, a mobile device, a tablet computer, a multifunction device, a server, a firewall or an Internet connected smart device.

15. The non-transitory computer-readable medium of claim 10, wherein the configuring comprises:
    maintaining, by the processor, the virus detection for a reduced number of potential viruses compared to the normal virus detection including one or more targeted viruses.

16. The non-transitory computer-readable medium of claim 10, wherein the configuring comprises:
    reducing, by the processor, the number of virus detection processes to a specific portion of the each one of the one or more of the plurality of different network elements.

17. The non-transitory computer-readable medium of claim 10, wherein the resuming comprises requiring the attribute to be below the at least one respective threshold for a duration of a back-off timer before resuming the normal virus detection.

18. A method for configuring a virus detection of a plurality of different network elements in a communication network, comprising:
    monitoring, by a processor, a respective attribute of each one of the plurality of network elements, wherein the attribute is different for each one of the plurality of different network elements, wherein the respective attribute is based on a performance and a type of a network element of the plurality of different network elements associated with the respective attribute;

detecting, by the processor, the respective attribute of one or more of the plurality of different network elements breaches a respective threshold;

configuring, by the processor, each one of the one or more of the plurality of different network elements to reduce a number of virus detection processes of the virus detection to detect a reduced number of potential viruses compared to a normal virus detection process for a specific portion of the each one of the one or more of the plurality of different network elements in accordance with a type of network element; and detecting, by the processor, the respective attribute of a respective one of the one or more of the plurality of different network elements does not breach the respective threshold;

determining, by the processor, the respective attribute continues to not breach the respective threshold for a duration of a back-off timer; and resuming, by the processor, a normal virus detection for the respective one of the one or more of the plurality of different network elements.

\* \* \* \* \*